(12) United States Patent
Takahashi et al.

(10) Patent No.: US 10,199,880 B2
(45) Date of Patent: Feb. 5, 2019

(54) WIRELESS POWER FEEDING UNIT, POWER TRANSMITTING MODULE, POWER RECEIVING MODULE, AND WIRELESS POWER TRANSMISSION SYSTEM

(71) Applicant: Panasonic Intellectual Property Management Co., Ltd., Osaka (JP)

(72) Inventors: Eiji Takahashi, Nara (JP); Hideaki Miyamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/825,763

(22) Filed: Nov. 29, 2017

(65) Prior Publication Data

US 2018/0152056 A1    May 31, 2018

(30) Foreign Application Priority Data

Nov. 30, 2016 (JP) ................. 2016-232180

(51) Int. Cl.
*H01F 38/14* (2006.01)
*H02J 50/80* (2016.01)
(Continued)

(52) U.S. Cl.
CPC ............. *H02J 50/40* (2016.02); *B25J 9/12* (2013.01); *B25J 19/0045* (2013.01); *H01F 38/14* (2013.01); *H02J 7/025* (2013.01); *H02J 50/12* (2016.02); *H02J 50/80* (2016.02); *H02P 3/18* (2013.01); *H02P 27/06* (2013.01)

(58) Field of Classification Search
CPC combination set(s) only.
See application file for complete search history.

(56) References Cited

U.S. PATENT DOCUMENTS 8,878,392 B2 * 11/2014 Lemmens ............... H02J 5/005
                                                                307/104
9,537,353 B1 * 1/2017 Bossetti ................... H02J 17/00
(Continued)

FOREIGN PATENT DOCUMENTS

JP      2014-180078 A    9/2014
JP      2015-104764 A    6/2015
WO   WO 2015/019478 A1   2/2015

*Primary Examiner* — Bentsu Ro
(74) *Attorney, Agent, or Firm* — Renner Otto Boisselle & Sklar, LLP

(57) ABSTRACT

A wireless power feeding unit includes a power transmitting module and a power receiving module. The power transmitting module includes: a first inverter circuit which is connected to a power source via a switch; a first transmission coil connected to the first inverter circuit; a second inverter circuit which is connected to the power source or another power source not via the switch; a second transmission coil which is connected to the second inverter circuit; and a power transmission control circuit which controls the first and second inverter circuits. The power receiving module includes a first reception coil opposed to the first transmission coil and a second reception coil opposed to the second transmission coil. During operation of the first and second inverter circuits, even while supply of power to the first inverter circuit is stopped, the power transmission control circuit maintains control of the second inverter circuit.

16 Claims, 13 Drawing Sheets

(51) Int. Cl.
  *H02J 50/40* (2016.01)
  *H02J 50/12* (2016.01)
  *B25J 9/12* (2006.01)
  *B25J 19/00* (2006.01)
  *H02P 3/18* (2006.01)
  *H02P 27/06* (2006.01)
  *H02J 7/02* (2016.01)

(56) References Cited

U.S. PATENT DOCUMENTS

| | | | |
|---|---|---|---|
| 9,837,827 B2 * | 12/2017 | Ben-Shalom | H01F 38/14 |
| 2011/0254379 A1 * | 10/2011 | Madawala | H02J 5/005 |
| | | | 307/104 |
| 2014/0266031 A1 | 9/2014 | Sasaki | |
| 2015/0001958 A1 * | 1/2015 | Abe | H02J 5/005 |
| | | | 307/104 |
| 2017/0310164 A1 * | 10/2017 | Abdolkhani | H02J 7/025 |

* cited by examiner

WIRELESS POWER FEEDING UNIT, POWER TRANSMITTING MODULE, POWER RECEIVING MODULE, AND WIRELESS POWER TRANSMISSION SYSTEM

BACKGROUND

1. Field of the Invention

The present disclosure relates to a wireless power feeding unit, a power transmitting module, a power receiving module, and a wireless power transmission system.

2. Description of the Related Art

Electrically operated apparatuses (e.g., robot hand apparatuses) which perform various operations by using an end effector(s) connected to the leading end(s) of one or more arms are being developed. Such electrically operated apparatuses are utilized in various kinds of work, such as carrying articles at a factory.

Japanese Laid-Open Patent Publication No. 2015-104764 discloses a vertical articulated type robot apparatus in which a plurality of frames are coupled in series via a plurality of joints that are capable of rotation. In this robot apparatus, electric power is supplied via cables to the rotary mechanism in each joint and to the end effector at the leading end of the arm.

On the other hand, in the recent years, wireless power transmission techniques for transmitting electric power in a wireless (contactless) manner have been being developed. For example, International Publication No. 2015/019478 and Japanese Laid-Open Patent Publication No. 2014-180078 each disclose a contactless power supplying apparatus which two sets of coils, i.e., one set for power transmission and another set for power reception.

SUMMARY

The present disclosure provides a novel wireless power transmission technique which improves the work efficiency in an electrically operated apparatus, e.g., a robot, that has a movable section(s).

A wireless power feeding unit according to one implementation of the present disclosure includes a power transmitting module and a power receiving module. The power transmitting module includes: a first inverter circuit which is connected to a power source via a switch, and which converts supplied electric power into first AC power and outputs the first AC power; a first transmission coil which is connected to the first inverter circuit, and which sends out the first AC power; a second inverter circuit which is connected to the power source or another power source not via the switch, and which converts supplied electric power into second AC power and outputs the second AC power; a second transmission coil which is connected to the second inverter circuit, and which sends out the second AC power; and a power transmission control circuit which is connected to the power source or another power source not via the switch, and which controls the first and second inverter circuits. The power receiving module includes: a first reception coil which is opposed to the first transmission coil, and which receives at least a portion of the first AC power; and a second reception coil which is opposed to the second transmission coil, and which receives at least a portion of the second AC power. At least a portion of the AC power received by the first reception coil is supplied to a load. At least a portion of the AC power received by the second reception coil is supplied to a load control circuit which controls the load. During operation of the first and second inverter circuits, even if the switch is turned OFF to stop supply of power to the first inverter circuit, the power transmission control circuit maintains control of the second inverter circuit.

These general and specific aspects may be implemented using a system, a method, an integrated circuit, a computer program, or a storage medium, or any combination of a system, an apparatus, a method, an integrated circuit, a computer program, and/or a storage medium.

According to one implementation of the present disclosure, the work efficiency in an apparatus that has a movable section(s), e.g., a robot, can be improved.

Other features, elements, processes, steps, characteristics and advantages of the present invention will become more apparent from the following detailed description of preferred embodiments of the present invention with reference to the attached drawings.

DETAILED DESCRIPTION (Findings Providing the Basis of the Present Disclosure)

Prior to describing embodiments of the present disclosure, findings providing the basis of the present disclosure will be described.

Figure 1:
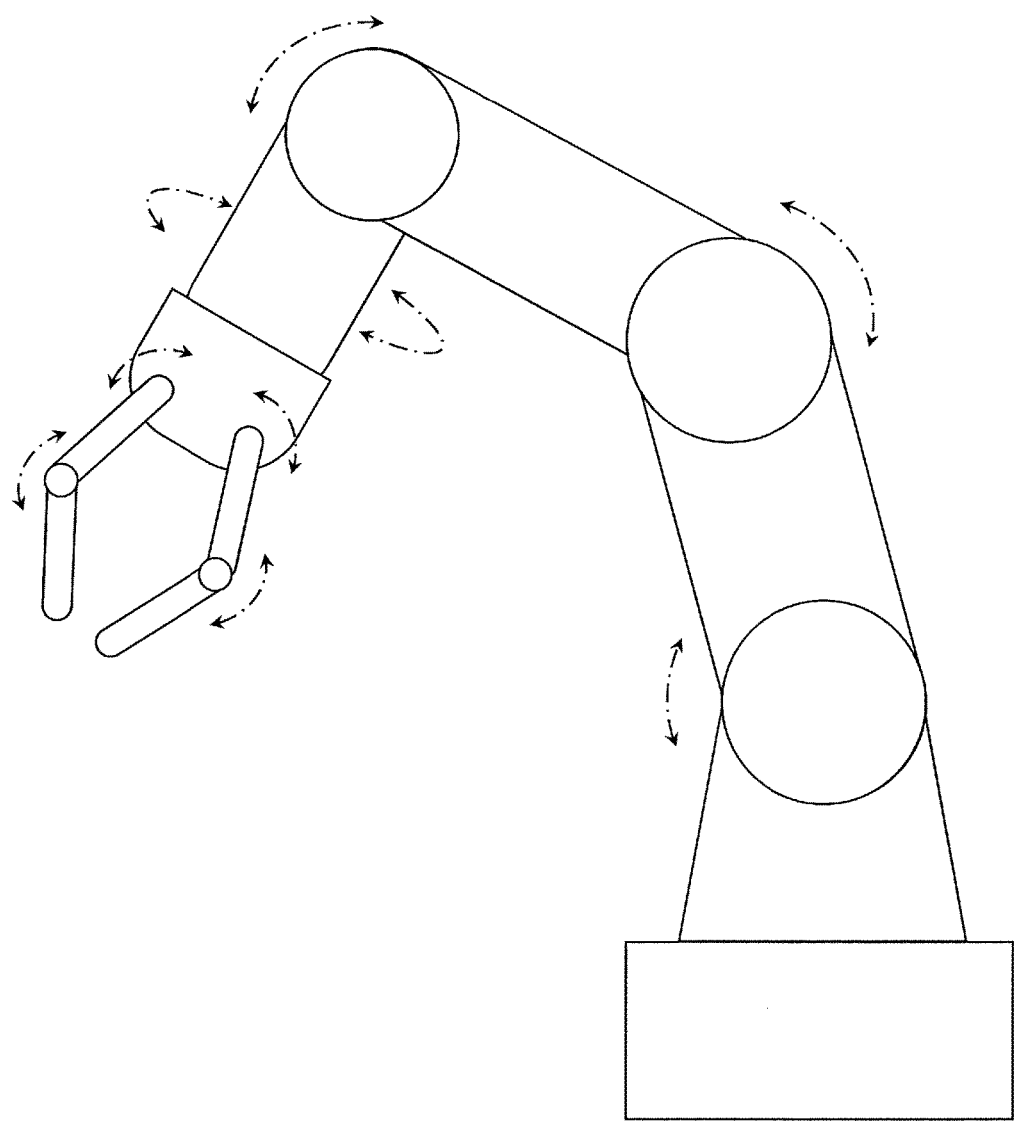
FIG. 1 is a diagram schematically showing an example of a robot arm apparatus having a plurality of movable sections (e.g., joints).

FIG. 1 is a diagram schematically showing an example of a robot arm apparatus having a plurality of movable sections (e.g., joints). Each movable section is constructed so as to be capable of rotation or expansion/contraction by means of an actuator that includes an electric motor (which hereinafter may simply be referred to as a "motor"). In order to control such an apparatus, it is necessary to individually supply electric power to the plurality of motors and control them. Supply of power from a power source to the plurality of motors has conventionally been achieved via a multitude of cables.

Figure 2:
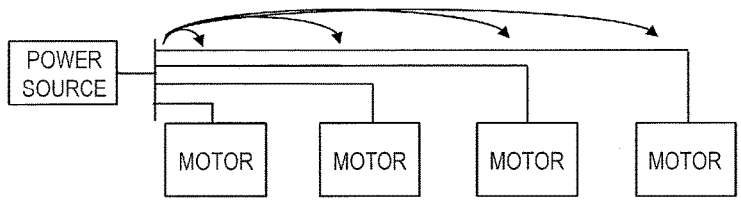
FIG. 2 is a diagram schematically showing a conventional construction in which power is supplied via cables.

FIG. 2 is a diagram schematically showing such a conventional construction. In the construction shown in FIG. 2, electric power is supplied from a power source to a plurality of motors via wired bus connections. Each motor is controlled by a control device (controller) not shown.

Figure 3:
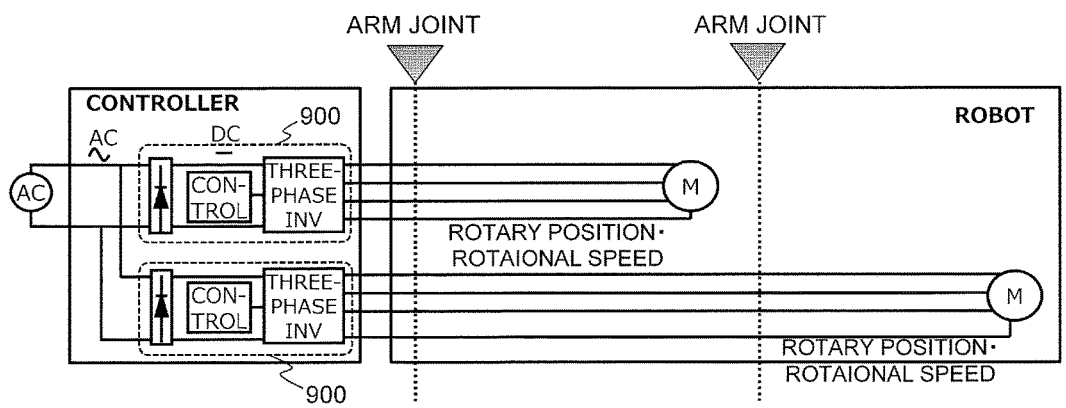
FIG. 3 is a diagram showing a specific example of the conventional construction shown in FIG. 2.

FIG. 3 is a diagram showing a specific example of the conventional construction shown in FIG. 2. A robot in this example has two joints. Each joint is driven by a servo motor M. Each servo motor M is driven with a three-phase current. A controller includes as many motor driving circuits 900 as there are motors M to be controlled. Each motor driving circuit 900 includes a converter, a three phase inverter, and a control circuit. The converter converts alternating current (AC) power from a power source into direct current (DC) power. The three phase inverter converts the DC power which is output from the converter into a three-phase AC power, and supplies it to the motor M. The control circuit controls the three phase inverter to supply necessary power to the motor M. The motor driving circuit 900 obtains information concerning rotary position and rotational speed from the motor M, and adjusts the voltage of each phase based on this information. Such construction allows the operation of each joint to be controlled.

However, in this construction, as many cables as there are motors need to be provided. This causes accidents due to snagging of cables, which leads to the problems of limited ranges of motion and difficulty in changing parts. Moreover, repetitive bending of cables may deteriorate the cables, or even disrupt them. Therefore, the inventors have sought to reduce the cables in a movable section by applying a wireless power transmission technique.

Figure 4:
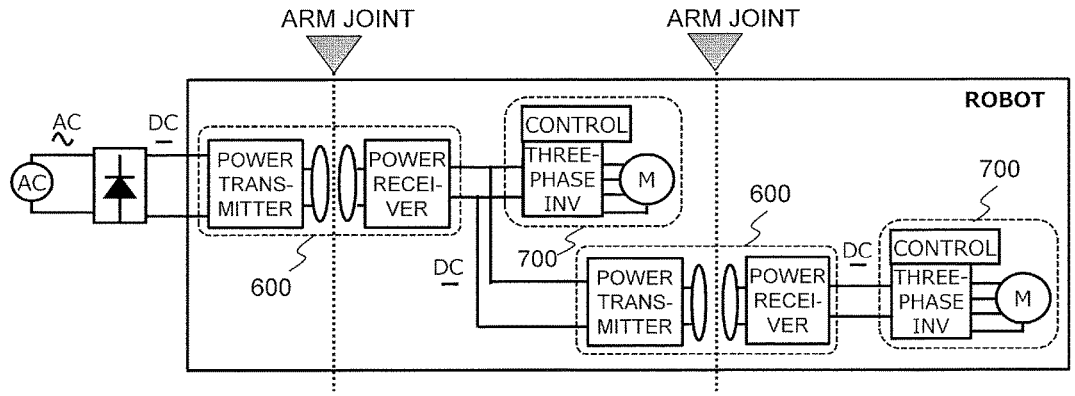
FIG. 4 is a diagram showing an exemplary construction of a robot in which power transmission in each joint is achieved wirelessly.

FIG. 4 is a diagram showing an exemplary robot in which power transmission in each joint is achieved wirelessly. In this example, a three phase inverter and a control circuit to drive each motor M are provided within the robot, rather than in an external controller. In each joint, wireless power transmission is performed by utilizing magnetic field coupling between a transmission coil and a reception coil. In each joint, this robot includes a wireless power feeding unit 600 and an electromechanical motor 700. Each electromechanical motor 700 includes a motor M, a three phase inverter, and a control circuit. Each wireless power feeding unit 600 includes a power transmitting circuit (also referred to as a "power transmitter"), a transmission coil, a reception coil, and a power receiving circuit (also referred to as a "power receiver"). The power transmitting circuit includes an inverter circuit. The power receiving circuit includes a rectifier circuit. The power transmitting circuit in the left wireless power feeding unit 600 shown in FIG. 4, which is connected between a power source and the transmission coil, converts the supplied DC power into AC power, and supplies it to the transmission coil. The power receiving circuit converts the AC power which the reception coil has received from the transmission coil into DC power, and outputs it. The DC power which has been output from the power receiving circuit is supplied not only to the electromechanical motor 700, but also the power transmitting circuit in the wireless power feeding unit 600 in any other joint. In this manner, electric power is also supplied to the electromechanical motors 700 driving the other joints.

Figure 5:
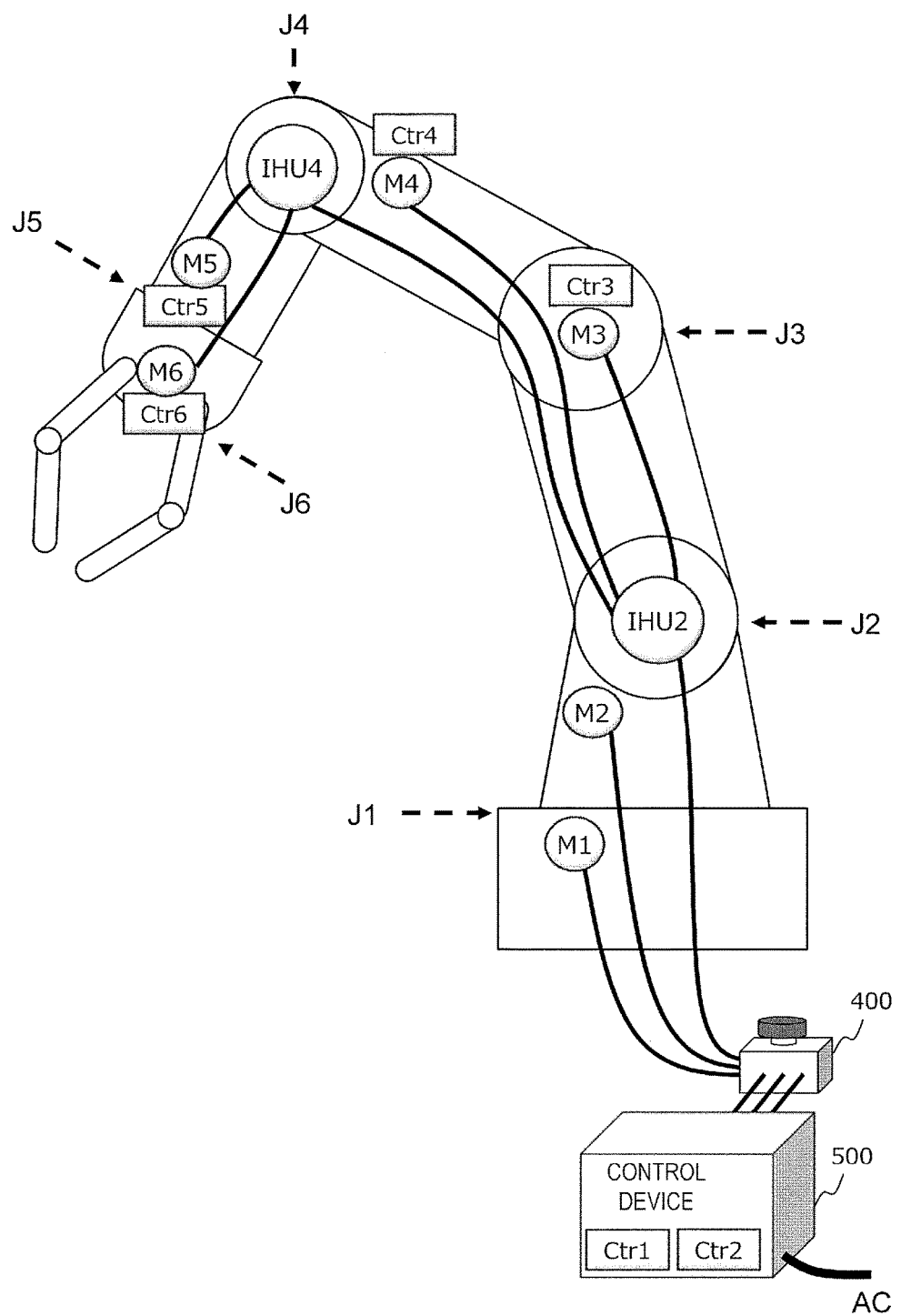
FIG. 5 is a diagram showing an example of a robot arm apparatus in which wireless power transmission is applied.

FIG. 5 is a diagram showing an example of a robot arm apparatus in which the above-described wireless power transmission is applied. This robot arm apparatus has joints J1 to J6. Among these, the above-described wireless power transmission is applied to the joints J2 and J4. On the other hand, conventional wired power transmission is applied to the joints J1, J3, J5, and J6. The robot arm apparatus includes: a plurality of motors M1 to M6 which respectively drive the joints J1 to J6; motor control circuits Ctr3 to Ctr6 which respectively control the motors M3 to M6 among the motors M1 to M6; and two wireless power feeding units (intelligent robot harness units; also referred to as IHUs) IHU2 and IHU4 which are respectively provided in the joints J2 and J4. Motor control circuits Ctr1 and Ctr2 which respectively drive the motors M1 and M2 are provided in a control device 500 which is external to the robot.

The control device 500 supplies electric power to the motors M1 and M2 and the wireless power feeding unit IHU2 in a wired manner. At the joint J2, the wireless power feeding unit IHU2 wirelessly transmits electric power via a pair of coils. The transmitted electric power is then supplied to the motors M3 and M4, the control circuits Ctr3 and Ctr4, and the wireless power feeding unit IHU4. The wireless power feeding unit IHU4 also wirelessly transmits electric power via a pair of coils in the joint J4. The transmitted electric power is supplied to the motors M5 and M6 and the control circuits Ctr5 and Ctr6. With such construction, cables for power transmission can be eliminated in the joints J2 and J4.

Now, for safety reasons, such an industrial robot as is shown in FIG. 5 needs to have a switch for emergency stop. More specifically, there are standards stipulating that a switch for making an emergency stop (a push button) needs to be provided, such that the switch has a direct opening mechanism. A direct opening mechanism is a structure where a normally-closed (NC) contact is opened with the force by which a button is pressed, thereby cutting a current flow. In order to comply with this requirement under the safety standards, the example shown in FIG. 5 includes a switch 400 for emergency stop being provided between the control device 500 and the robot, the switch having a direct opening mechanism. By pressing the switch 400 (i.e., OFF), supply of power to each motor of the robot is forcedly cut, whereby the robot can be safely stopped.

However, turning the switch 400 OFF to cut power to the robot stops not only supply of power to the motors M1 to M6, but also supply of power to the control circuits Ctr3 to Ctr6. As a result, when powering is begun again, initial operations associated with reboot of the respective control circuits must be performed again, thus resulting in the problem that a long time is required until operation can be resumed. A consequent operation resulting from this may be, for example: each arm section and hand (end effector) of the robot is forcedly returned to its initial position before operation can begin again. Such an operation makes it difficult to promptly begin work again from where the robot stopped, thus inducing deteriorations in work efficiency.

These problems are not confined to motor-driven apparatuses, but may similarly occur in any device that includes a load and a control circuit to control the load, such that the load operates with electric power.

The inventors have found the aforementioned problems, and sought for constructions for solving these problems. The inventors have arrived at a novel construction, thereby accomplishing the technique according to the present disclosure, which, even after supply of power to a load such as a motor is stopped with an emergency stop switch, maintains supply of power to a load control circuit that controls the load. Hereinafter, the technique according to the present disclosure will be described in outline.

A wireless power feeding unit according to one implementation of the present disclosure includes:
a power transmitting module; and
a power receiving module,
the power transmitting module including
a first inverter circuit which is connected to a power source via a switch, and which converts supplied electric power into first AC power and outputs the first AC power,
a first transmission coil which is connected to the first inverter circuit, and which sends out the first AC power,
a second inverter circuit which is connected to the power source or another power source not via the switch, and which converts supplied electric power into second AC power and outputs the second AC power,
a second transmission coil which is connected to the second inverter circuit, and which sends out the second AC power, and
a power transmission control circuit which is connected to the power source or another power source not via the switch, and which controls the first and second inverter circuits,
the power receiving module including
a first reception coil which is opposed to the first transmission coil, and which receives at least a portion of the first AC power, and
a second reception coil which is opposed to the second transmission coil, and which receives at least a portion of the second AC power, wherein,
at least a portion of the AC power received by the first reception coil is supplied to a load;
at least a portion of the AC power received by the second reception coil is supplied to a load control circuit which controls the load; and
during operation of the first and second inverter circuits, even if the switch is turned OFF to stop supply of power to the first inverter circuit, the power transmission control circuit maintains control of the second inverter circuit.

In accordance with the above construction, the first inverter circuit which generates electric power to be supplied to the load (which may hereinafter be referred to as "power for driving purposes" or "drive power") is connected to the power source via the switch. On the other hand, the second inverter circuit which generates electric power to be supplied to the load control circuit (which may hereinafter be referred to as "power for control purposes" or "control power") and the power transmission control circuit are connected to the power source or another power source not via the switch. As a result, even if the switch is turned OFF so that power transmission by the first inverter circuit is stopped, power transmission by the second inverter circuit is continued, so that supply of power to the load control circuit can be maintained. As a result, when the switch is turned ON to restore supply of power to the motor, the motor operation can be promptly resumed.

In the present specification, a "load" means any device that may operate with electric power. Examples of "loads" include devices such as motors, cameras (imaging devices), light sources, secondary batteries, and electronic circuits (e.g., power conversion circuits or microcontrollers). A device which includes a load and a circuit to control the load may be referred to as a "load device".

Hereinafter, more specific embodiments of the present disclosure will be described. Note however that unnecessarily detailed descriptions may be omitted. For example, detailed descriptions on what is well known in the art or redundant descriptions on what is substantially the same construction may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, identical or similar constituent elements are denoted by identical reference numerals.

Embodiment 1

Figure 6:
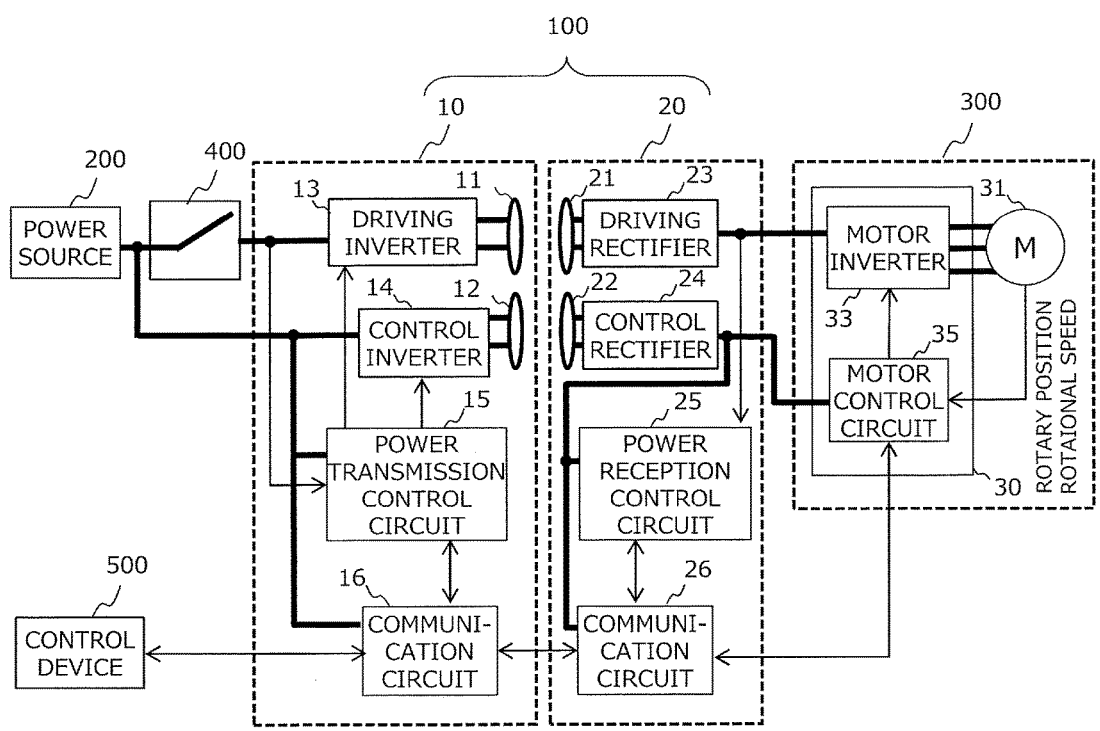
FIG. 6 is a block diagram showing the construction of a wireless power transmission system according to illustrative Embodiment 1 of the present disclosure.

FIG. 6 is a block diagram showing the construction of a wireless power transmission system according to illustrative Embodiment 1 of the present disclosure. For example, this wireless power transmission system may be adopted in an electric machine, such as a robot arm apparatus used to carry articles in a factory. The wireless power transmission system according to the present embodiment includes a wireless power feeding unit 100, a power source 200 which is connected to the wireless power feeding unit 100, an emergency stop switch 400, an actuator (as one example of a load device) 300, and a controller (control device) 500. Note that at least one of the power source 200, the switch 400, the controller 500, and the actuator 300 may be an external element to the wireless power transmission system. In FIG. 6, thick lines indicate supply lines of electric power, whereas arrows indicate supply lines of signals.

The wireless power feeding unit 100 includes a power transmitting module 10 and a power receiving module 20. The power transmitting module 10 includes a first inverter circuit (also referred to as a "driving inverter") 13, a first transmission coil 11, a second inverter circuit (also referred to as a "control inverter") 14, a second transmission coil 12, a power transmission control circuit 15, and a first communication circuit 16. The driving inverter 13, which is connected to the power source 200 via the switch 400, converts supplied electric power into first AC power and outputs it. The first transmission coil 11, which is connected to the driving inverter 13, sends out the first AC power. The control inverter 14, which is connected to the power source 200 not via the switch 400, converts supplied electric power into second AC power and outputs it. The second transmission coil 12, which is connected to the control inverter 14, sends out the second AC power. The power transmission control circuit 15, which is connected to the power source 200 not via the switch 400, controls the driving inverter 13, the control inverter 14, and the first communication circuit 16. The first communication circuit 16 is connected to the power source 200 not via the switch 400. The first communication circuit 16 sends a signal for controlling the motor 31 (as one example of a load) in the actuator 300. The signal for controlling the motor 31 may be a signal representing a command value of e.g. rotational speed of the motor 31, for example. The signal is supplied from the external controller 500 to the power transmitting module 10.

The power receiving module 20 includes a first reception coil 21, a first rectifier circuit (also referred to as a "driving rectifier") 23, a second reception coil 22, a second rectifier circuit (also referred to as a "control rectifier") 24, a power reception control circuit 25, and a second communication circuit 26. The first reception coil 21 is opposed to the first transmission coil 11. The first reception coil 21 receives at least a portion of the first AC power which is sent out from the first transmission coil 11. The driving rectifier 23, which is connected to the first reception coil 21, converts the AC power received by the first reception coil 21 into first DC power and outputs it. The second reception coil 22 is opposed to the second transmission coil 12. The second reception coil 22 receives at least a portion of the second AC power which has been transmitted from the second transmission coil 12. The control rectifier 24, which is connected to the second reception coil 22, converts the AC power received by the second reception coil 22 into second DC power and outputs it. The power reception control circuit 25 is driven by the second DC power output from the control rectifier 24, and controls the second communication circuit 26. The second communication circuit 26 performs communications between the first communication circuit 16 on the power transmission side and the motor control circuit 35 in the actuator 300. The second communication circuit 26 receives a signal which has been sent from the first communication circuit 16, and sends it to the motor control circuit 35. In response to a request from the motor control circuit 35, the second communication circuit 26 may send a signal with which to perform an operation of compensating for the load variation in the motor 31, for example, to the first communication circuit 16. Based on this signal, the power transmission control circuit 15 can control the driving inverter 13 to adjust drive power. As a result, for example, an always-constant voltage may be given to the motor inverter 33 in the actuator 300.

The actuator 300 according to the present embodiment causes the power receiving module 20 to move or rotate relative to the power transmitting module 10. During this operation, the first transmission coil 11 and the first reception coil 21 maintain an opposed state, and the second transmission coil 12 and the second reception coil 22 also maintain an opposed state. The actuator 300 includes a servo motor 31 which is driven by a three-phase current, and a motor amplifier 30 to drive the motor 31. The motor amplifier 30 includes: a motor inverter (motor driving circuit) 33 which converts the DC power having been output from the driving rectifier 23 into three-phase AC power, and supplies it to the motor 31; and a motor control circuit 35 which controls the motor inverter 33. During operation of the motor 31, the motor control circuit 35 detects information on rotary position and rotational speed by using e.g. a rotary encoder, and based on this information, controls the motor inverter 33 so as to realize a desired rotating operation. Note that the motor 31 may not be a motor which is driven with a three-phase current. In the case where the motor 33 is a DC-driven motor, a motor driving circuit which is suited for that motor construction is to be used instead of a three phase inverter.

At least a portion of the first DC power which is output from the driving rectifier 23 is supplied to the motor inverter 33. At least a portion of the second DC power which is output from the control rectifier 24 is supplied to the motor control circuit 35. Even if the switch 400 is turned OFF during operation of the driving inverter 13 and the control inverter 14 so that supply of power to the driving inverter 13 is stopped, the power transmission control circuit 15 maintains control of the control inverter 14. As a result, even after supply of power to the motor inverter 33 is stopped, supply of power to the motor control circuit 35 is maintained. Since the motor control circuit 35 stores the operation status existing at the time when the motor 31 stops, it is possible to swiftly resume the operation of the actuator 300 when the switch 400 is turned ON again so that powering is begun again.

In order to realize the above operation, the power transmission control circuit 15 performs power transmission control while monitoring the electric power which is supplied to the driving inverter 13. By detecting a decrease in the electric power value that is being input to the driving inverter 13, the power transmission control circuit 15 detects that the emergency stop switch 400 has been pressed (i.e., the switch 400 has been turned OFF). Upon detecting a decrease (or stop) of the supplied electric power, the power transmission control circuit 15 stops control of the driving inverter 13, while maintaining control of the control inverter 14. In the meantime, the power transmission control circuit 15 may instruct the communication circuit 16 to send a predetermined signal (e.g., a command to stop the motor) to the motor control circuit 35. Upon receiving this signal, the motor control circuit 35 can stop controlling the motor inverter 33. When electric power to the driving system is suspended, this prevents unnecessary inverter control from being continued.

Thus, in the present embodiment, electric power for motor control purposes is input independently of the electric power for motor driving purposes. Moreover, electric power for control and communication purposes in the wireless power feeding unit 100 is input independently of the electric power for driving purposes. As a result, even when powering of the motor 31 in the actuator 300 is cut by the emergency stop switch 400, it is still possible to supply electric power to the control system and the communication system. Thus, safety is ensured while the drive power is suspended, and once emergency stop is canceled, it is possible to safely and swiftly resume the usual operation.

Next, the construction of the respective constituent elements in the present embodiment will be described in more detail.

Figure 7A:
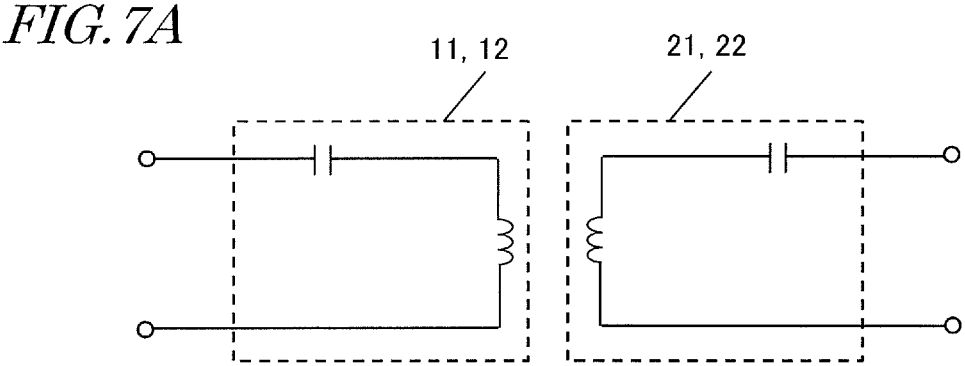
FIG. 7A is a diagram showing an exemplary equivalent circuit for transmission coils 11 and 12 and reception coils 21 and 22 in a wireless power feeding unit 100.

FIG. 7A is a diagram showing an exemplary equivalent circuit for the transmission coils 11 and 12 and the reception coils 21 and 22 in the wireless power feeding unit 100. As shown in the figure, each coil functions as a resonant circuit having an inductance component and a capacitance component. By ensuring that the resonant frequencies of two coils opposing each other have close values, electric power can be transmitted with a high efficiency. Each transmission coil receives AC power supplied from an inverter circuit. Owing to a magnetic field that is generated with this AC power from the transmission coil, electric power is transmitted to the reception coil. In this example, the transmission coils 11 and 12 and the reception coils 21 and 22 both function as series resonant circuits.

Figure 7B:
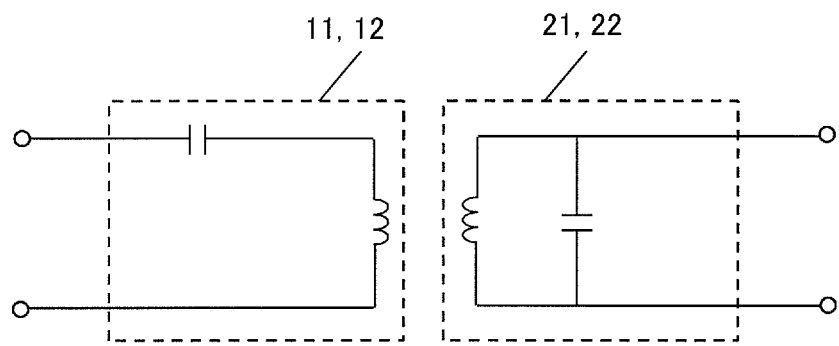
FIG. 7B is a diagram showing another exemplary equivalent circuit for transmission coils 11 and 12 and reception coils 21 and 22 in the wireless power feeding unit 100.

FIG. 7B is a diagram showing another exemplary equivalent circuit for the transmission coils 11 and 12 and the reception coils 21 and 22 in the wireless power feeding unit 100. In this example, the transmission coils 11 and 12 function as series resonant circuits, whereas the reception coils 21 and 22 function as parallel resonant circuits. In another possible implementation, the transmission coils 11 and 12 may constitute parallel resonant circuits.

Each coil may be, for example, a planar coil or a laminated coil that is formed on a circuit board, or a wound coil of a copper wire, a litz wire, a twisted wire, or the like. The capacitance component in each resonant circuit may be realized by the parasitic capacitance of the coil, or alternatively a capacitor of a chip shape or a lead shape may be additionally provided, for example.

Typically, the resonant frequency f0 of the resonant circuit is set equal to the transmission frequency f that exists during power transmission. The resonant frequency f0 of each resonant circuit may not be exactly equal to the transmission frequency f. Each resonant frequency f0 may be set to a value in the range of about 50% to 150% of the transmission frequency f, for example. The frequency f of power transmission may be set to e.g. 50 Hz to 300 GHz, more preferably 20 kHz to 10 GHz, still more preferably 20 kHz to 20 MHz, and still more preferably 20 kHz to 7 MHz. Within any such frequency band, a frequency of drive power and a frequency of control power may be selected. The frequency of drive power and the frequency of control power may be set to different values.

Figure 8A:
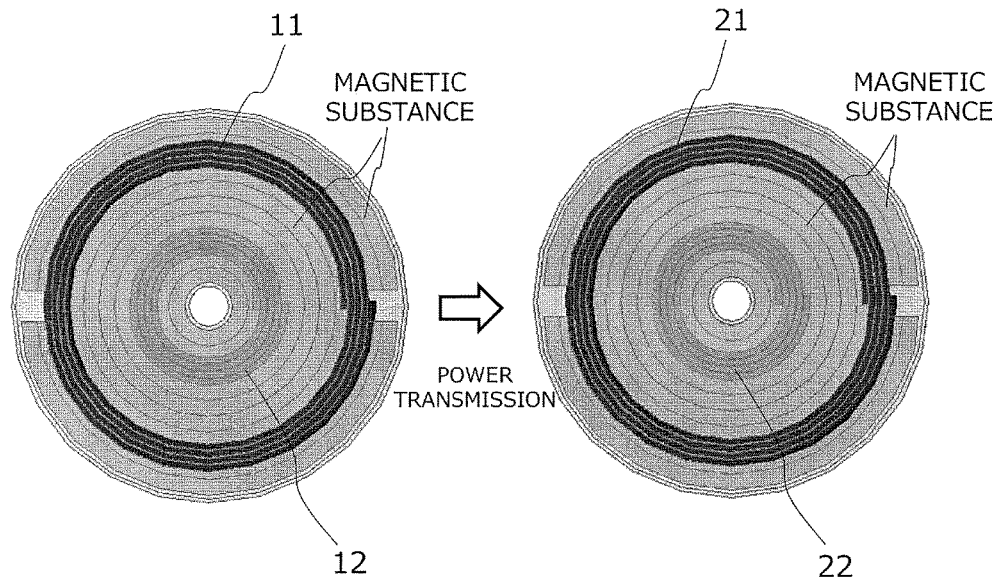
FIG. 8A is a diagram showing exemplary relative positions of transmission coils 11 and 12 and reception coils 21 and 22.

FIG. 8A is a diagram showing exemplary relative positions of the transmission coils 11 and 12 and the reception coils 21 and 22. The structure in this example may be applied to a coil in a movable section that is capable of rotating, such as a joint of a robot. Although the reception coils 21 and 22 actually are opposed respectively to the transmission coils 11 and 12, FIG. 8A illustrates these coils as being side by side, for ease of understanding. In this example, the transmission coils 11 and 12 and the reception coils 21 and 22 are all planar coils of circular shape. The transmission coils 11 and 12 are disposed concentrically, such that the transmission coil 12 fits inside the transmission coil 11. Similarly, the reception coils 21 and 22 are disposed concentrically, such that the reception coil fits inside the reception coil 21. Contrary to this example, the transmission coil 11 may be disposed inside the transmission coil 21, and the reception coil 21 may be disposed inside the reception coil 22. Each of the transmission coils 11 and 12 and the reception coils 21 and 22 in this example is covered with a magnetic substance.

Figure 8B:
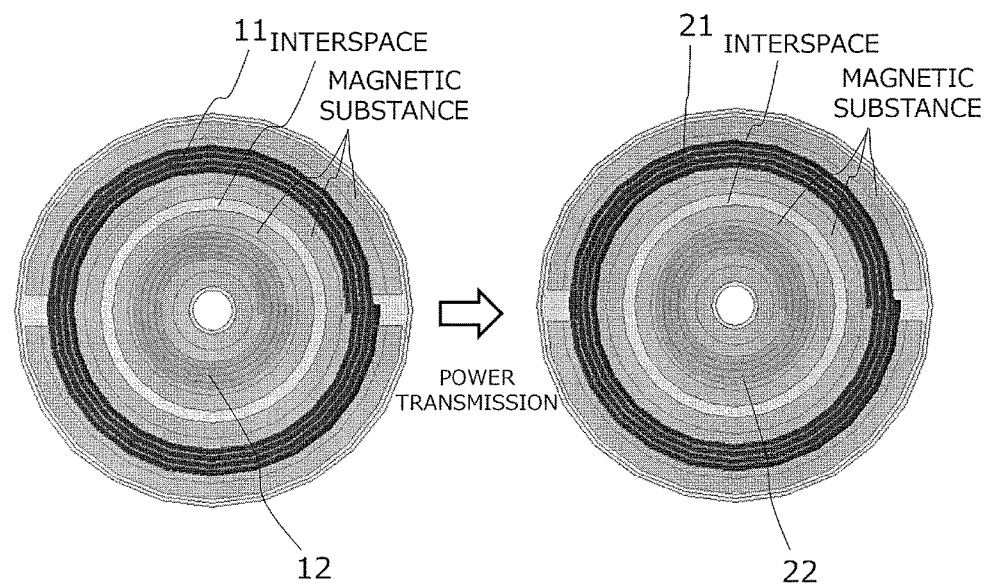
FIG. 8B is a diagram showing another exemplary construction for the transmission coils 11 and 12 and the reception coils 21 and 22.

FIG. 8B is a diagram showing another exemplary construction for the transmission coils 11 and 12 and the reception coils 21 and 22. In the example of FIG. 8B, an interspace (air gap) exists between the magnetic substance covering the transmission coil 11 and the magnetic substance covering the transmission coil 21, and between the magnetic substance covering the reception coil 21 and the magnetic substance covering the reception coil 22. It has been found that providing such air gaps suppresses electromagnetic interference between coils.

Figure 8C:
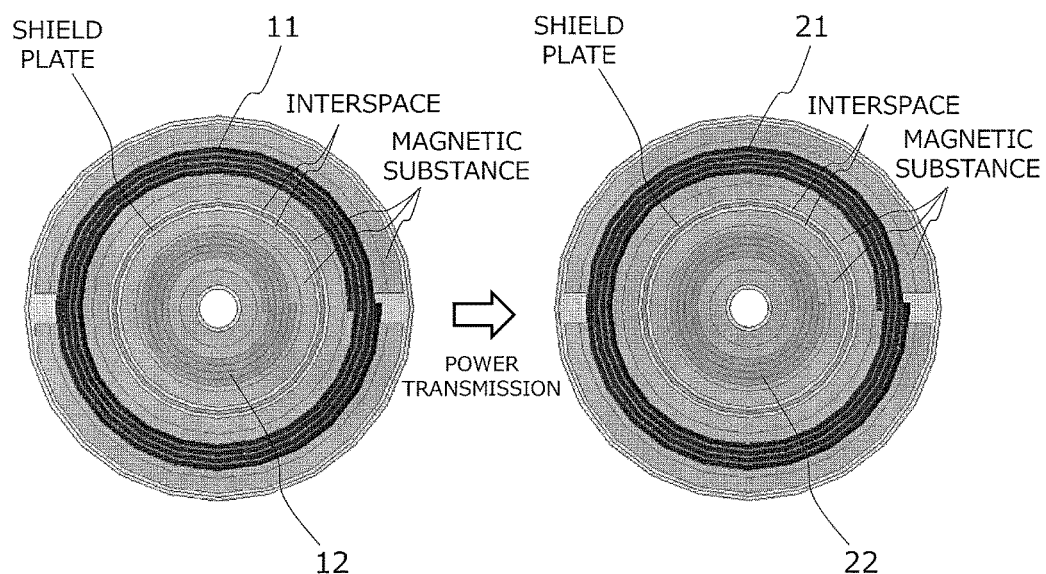
FIG. 8C is a diagram showing still another exemplary construction for the transmission coils 11 and 12 and the reception coils 21 and 22.

FIG. 8C is a diagram showing still another exemplary construction for the transmission coils 11 and 12 and the reception coils 21 and 22. In the example of FIG. 8C, a shield plate is further added to the construction shown in FIG. 8B. The shield plate shown in the figure is an electrically conductive member of annular shape which is disposed in the interspace between pieces of magnetic substance. It has been found that adding a shield plate inside an air gap allows for further suppression of electromagnetic interference between coils.

Figure 8D:
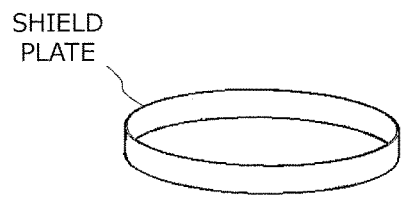
FIG. 8D is a diagram showing an exemplary shield plate.
Figure 8E:
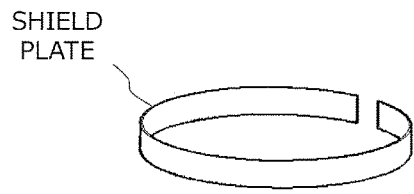
FIG. 8E is a diagram showing another exemplary shield plate.

A shield plate may be annular, as shown in FIG. 8D. A shield plate may be an annular shape with one or more slits in it, such as shown in FIG. 8E. By providing slits, an eddy current that is induced in the shield plate owing to a magnetic field that is generated by the coil can be suppressed. In other words, decrease in the Q value of the coil can be suppressed.

The material of a shield plate may be a metal such as copper or aluminum, for example. Otherwise, the following constructions may be employed as shield plates or alternatives thereof.
  a construction obtained by coating the side wall of an air gap between pieces of magnetic substance with an electrically conductive paint (e.g., a silver paint or a copper paint) a construction obtained by attaching an electrically conductive tape (e.g., a copper tape or an aluminum tape) on the side wall of an air gap between pieces of magnetic substance
  an electrically conductive plastic (i.e., a material including a metal filler kneaded in a plastic)

Any of these may exhibit a similar function to that of the aforementioned shield plate. Such constructions will collectively be referred to as "shields". The shape of a shield is not limited to an annular shape as is shown in the figures. A shield may have a polygonal or elliptical shape, for example. A plurality of metal plates may be placed together to compose a shield.

In the constructions of FIG. 8B and FIG. 8C, Table 1 shows results of analyzing the width of the air gap between pieces of magnetic substance, the coupling coefficient (Ltxp-LRxp) between the transmission coil 11 for driving purposes and the reception coil 11 for driving purposes, and the coupling coefficient (Ltxc-LRxp) between the transmission coil 12 for control purposes and the reception coil 21 for driving purposes. Assuming that the gap between coils is 2 mm; each coil 11, 21 for driving purposes has a diameter of 50 mm; each coil 12, 22 for control purposes has a diameter of 25 mm; the material of the shield plates is aluminum; the thickness of the shield plates is 0.5 mm, the coupling coefficients were determined through electromagnetic field analysis.

TABLE 1

| air gap size between magnetic substance pieces | | 0 mm | 1 mm | 2 mm |
|---|---|---|---|---|
| coupling coefficients (without shield plates) | Ltxp - LRxp | 0.845 | 0.820 | 0.802 |
| | Ltxc - LRxp | 0.250 | 0.163 | 0.105 |
| coupling coefficients (with shield plates) | Ltxp - LRxp | — | 0.778 | 0.776 |
| | Ltxc - LRxp | — | 0.013 | 0.006 |

It can be seen from the results of Table 1 that increasing the air gap between pieces of magnetic substance reduces the coupling coefficient (Ltxc-Lrxp) between the transmission coil 12 for control purposes and the reception coil 21 for driving purposes. Although the interference between the coils 12 and 21 is sufficiently small even in the absence of an air gap (i.e., 0 mm), introducing an increased air gap further suppresses interference. In particular, providing shield plates further reduces the coupling coefficient (Ltxc-Lrxp) between the transmission coil 12 for control purposes and the reception coil 21 for driving purposes, thereby further reducing the interference between them. Although not shown in Table 1, interference between the transmission coil 11 for driving purposes and the reception coil 22 for control purposes can also be suppressed by introducing an increased air gap and providing shield plates.

One of the combination of transmission coils 11 and 12 and the combination of reception coils 21 and 22 may have a construction without an air gap between pieces of magnetic substance, such as shown in FIG. 8A, and the other may have a construction with an air gap between pieces of magnetic substance, such as shown in FIG. 8B. Moreover, one of the combination of transmission coils 11 and 12 and the combination of reception coils 21 and 22 may have a construction with a shield plate in an air gap between pieces of magnetic substance, such as shown in FIG. 8C, and the other may have a construction without shield plates, such as shown in FIG. 8A and FIG. 8B. With such constructions, too, the effect of suppressing electromagnetic interference between coils is obtained.

The shapes and relative positions of the transmission coils 11 and 12 and the reception coils 21 and 22 are not limited to those exemplified in FIGS. 8A and 8B, and they permit various structures. For example, in any site of a robot arm that undergoes linear motion (e.g., expansion or contraction), a coil of rectangular shape may be used.

Figure 9:
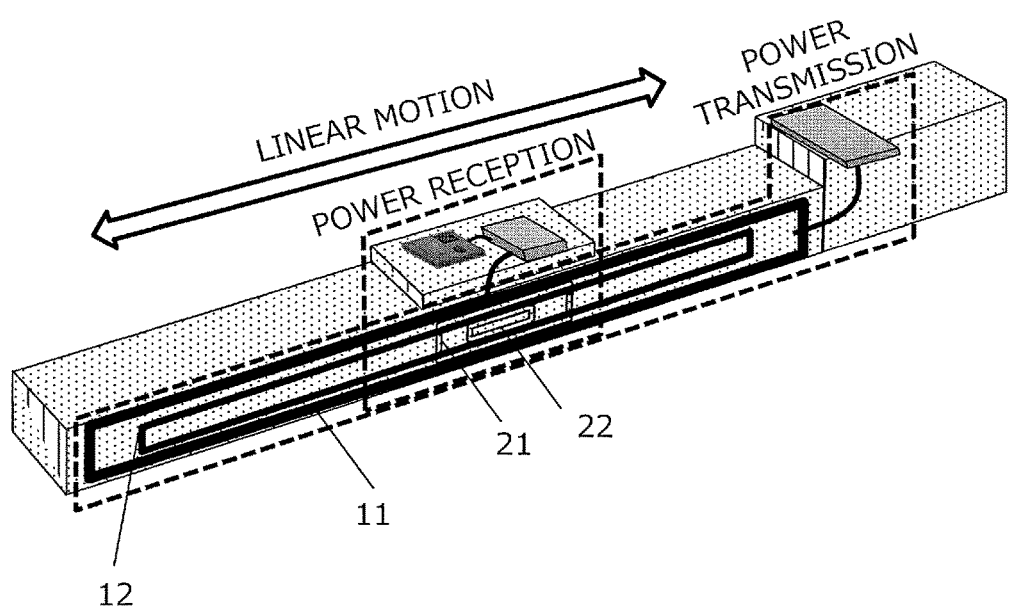
FIG. 9 is a perspective view showing another exemplary arrangement of coils 11, 12, 21 and 22 in a linear motion section of an arm.

FIG. 9 is a perspective view showing another exemplary arrangement of coils 11, 12, 21 and 22 in a linear motion section of an arm. In this example, each coil 11, 12, 21, 22 has a rectangular shape which is elongated in the direction that the arm moves. The transmission coils 11 and 12 are respectively larger than the reception coils 21 and 22. Moreover, the transmission coil 11 is larger than the transmission coil 12, and the reception coil 21 is larger than the reception coil 22. With this construction, even if the power receiving module moves relative to the power transmitting module, the coils will remain opposed. In the construction shown in FIG. 9, the transmission coil 11 may be smaller than the transmission coil 12, and the reception coil 21 may be smaller than the reception coil 22.

Figure 10A:
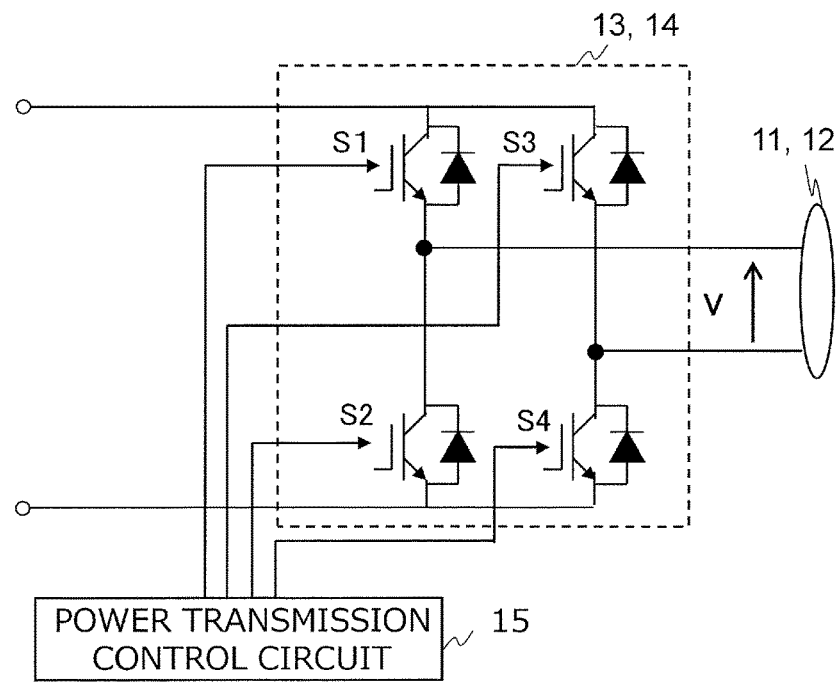
FIG. 10A is a diagram showing an exemplary construction of a full-bridge type inverter circuit.
Figure 10B:
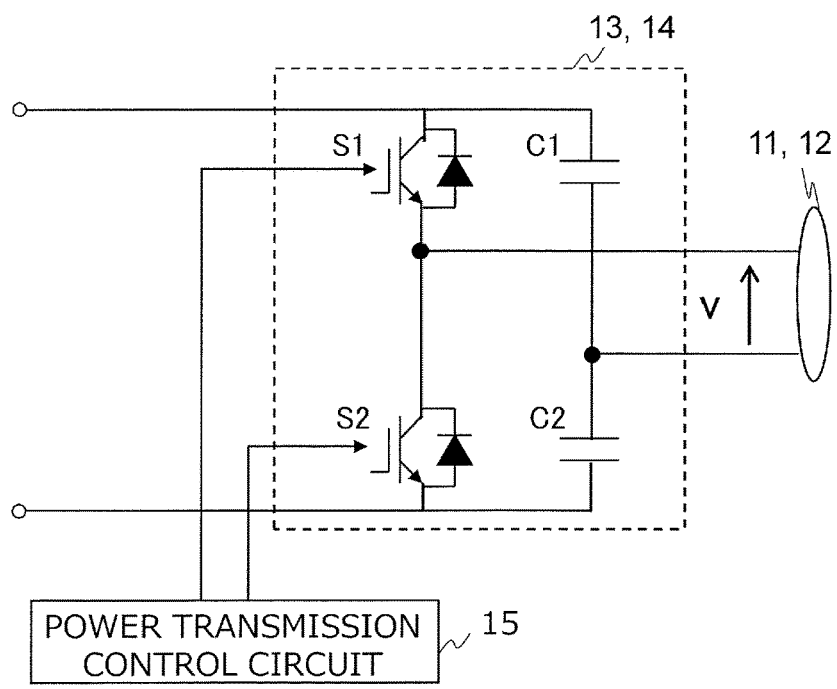
FIG. 10B is a diagram showing an exemplary construction of a half-bridge type inverter circuit.

FIGS. 10A and 10B are diagrams showing exemplary constructions for each inverter circuit 13, 14. FIG. 10A shows an exemplary construction of a full-bridge type inverter circuit. In this example, by controlling ON or OFF of the four switching elements S1 to S4 included in the inverter circuit 13 or 14, the power transmission control circuit 15 converts input DC power into AC power having a desired frequency f and voltage V (effective values). In order to realize this control, the power transmission control circuit 15 may include a gate driver circuit that supplies a control signal to each switching element. FIG. 10B shows an exemplary construction of a half-bridge type inverter circuit. In this example, by controlling ON or OFF of the two switching elements S1 and S2 included in the inverter circuit 13 or 14, the power transmission control circuit 15 converts input DC power into AC power having a desired frequency f and voltage V (effective values). The inverter circuit 13 or 14 may have a different structure from what is shown in FIG. 10A or 10B.

The power transmission control circuit 15, the power reception control circuit 25, and the motor control circuit 35 can be implemented as circuits including a processor and a memory, e.g., microcontroller units (MCU). By executing a computer program which is stored in the memory, various controls can be performed. The power transmission control circuit 15, the power reception control circuit 25, and the motor control circuit 35 may be implemented in special-purpose hardware that is adapted to perform the operation according to the present embodiment.

The communication circuits 16 and 26 are able to transmit or receive signals by using a known wireless communication technique, optical communication technique, or modulation technique (e.g., frequency modulation or load modulation), for example. The mode of communication by the communication circuits 16 and 26 may be arbitrary, without being limited to any particular mode.

The motor 31 may be a motor that is driven with a three-phase current, e.g., a permanent magnet synchronous motor or an induction motor, although this is not a limitation. The motor 31 may any other type of motor, such as a DC motor. In that case, instead of the motor inverter 33 (which is a three-phase inverter circuit), a motor driving circuit which is suited for the structure of the motor 31 is to be used.

The power source 200 may be any power source that outputs DC power. The power source 200 may be any power source, e.g., a mains supply, a primary battery, a secondary battery, a photovoltaic cell, a fuel cell, a USB (Universal Serial Bus) power source, a high-capacitance capacitor (e.g., an electric double layer capacitor), or a voltage converter that is connected to a mains supply, for example. Although FIG. 6 illustrates an example where one common power source serves as the power source for the driving inverter 13 and as the power source for the control inverter 14, power transmission control circuit 15, and communication circuit 16, these power sources may be discrete.

The switch 400 is a switch for emergency stop, and has the aforementioned direct opening mechanism. However, this is not a limitation; the technique of the present disclosure is applicable also to other types of switches. The switch 400 selectively establishes conduction/non-conduction between the power source 200 and the driving inverter 13.

The controller 500 is a control device which controls the operation each load that is included in the wireless power transmission system. The controller 500 determines load command values (e.g., rotational speed and torque) that determine the operation status of the motor 31 of the actuator 300, and send them to the communication circuit 16.

Next, the operation of the power transmission control circuit 15 according to the present embodiment will be described in more detail.

Figure 11:
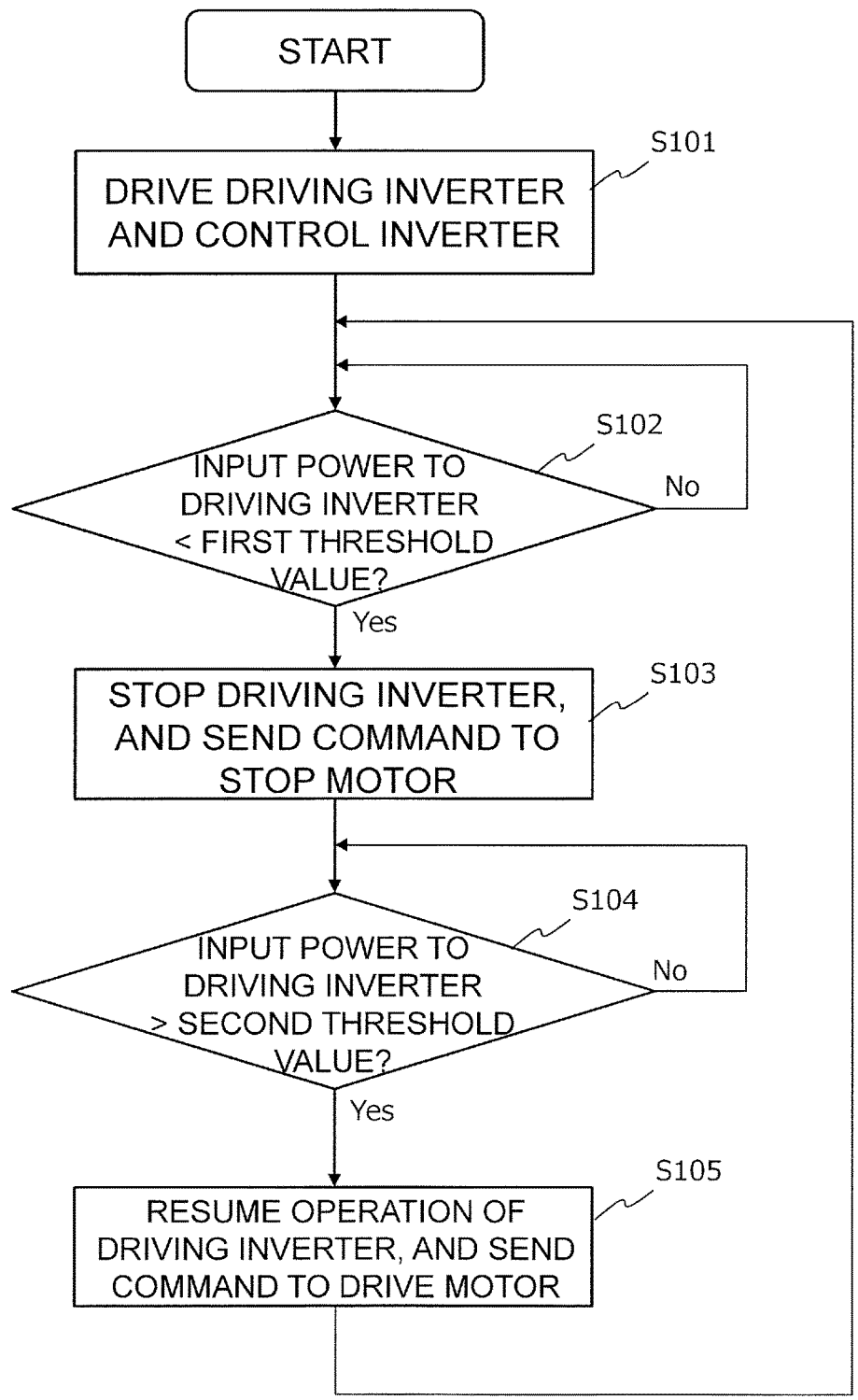
FIG. 11 is a flowchart showing an exemplary flow of control since, after power transmission is begun, an emergency stop switch 400 is pressed to stop powering for the motor 31, until powering is restored.

FIG. 11 is a flowchart showing an exemplary flow of control since, after power transmission is begun, the emergency stop switch 400 is pressed to stop powering for the motor 31, until powering is restored. First, at step S101, the power transmission control circuit 15 drives the driving inverter 13 and the control inverter 14 to begin power transmission. Thereafter, while monitoring the input power to the driving inverter 13, the power transmission control circuit 15 controls the control inverter 14. At step S102, upon detecting that the input power to the driving inverter has become lower than a predetermined threshold value (first threshold value), the power transmission control circuit 15 determines that an emergency stop by the switch 400 has been made. In that case, at step S103, the power transmission control circuit 15 stops the driving inverter 13, and causes the communication circuit 16 to send a signal representing a command to stop the motor. This signal is transmitted to the motor control circuit 35 via the communication circuit 26. In response to this signal, the motor control circuit 35 stops control of the motor inverter 33. As a result, not only does electric power cease to be supplied to the driving inverter 13 and the motor inverter 33, but control of the driving inverter 13 and the motor inverter 33 also stops.

While supply of power to the motor 31 is stopped, the power transmission control circuit 15 still keeps monitoring the input voltage to the driving inverter 13. Moreover, the motor control circuit 35 had stored to the memory the operation status (e.g., rotary position and rotational speed) of the motor 31 existing immediately before the stop.

Upon detecting at step S104 that the input power to the driving inverter 13 has exceeded a second threshold value which is equal to or greater than the first threshold value, the power transmission control circuit 15 determines that the emergency stop has been canceled. In that case, at step S105, the operation of the driving inverter 13 is resumed, and causes the communication circuit 16 to send a signal representing a command that the motor again needs to be driven. This signal is transmitted to the motor control circuit 35 via the communication circuit 26. In response to this signal, the motor control circuit 35 resumes control of the motor inverter 33.

Through the above operation, even if the driving system has come to an emergency stop by virtue of the switch 400, operation of the control system is continued, such that operation of the actuator 300 can be swiftly resumed once electric power to the driving system is restored. In the present embodiment, in particular, not only does electric power cease to be supplied to the driving inverter 13 and the motor inverter 33 upon an emergency stop, but control of the driving inverter 13 and the motor inverter 33 also stops, whereby the emergency stop can be made in a safer manner.

Embodiment 2

Next, a wireless power transmission system according to Embodiment 2 will be described. The wireless power transmission system according to the present embodiment includes a plurality of wireless power feeding units that are connected in series. In Embodiment 1, only one wireless power feeding unit 100 is provided between the power source 200 and the terminal load device 300. On the other hand, in the present embodiment, two or more wireless power feeding units are provided between the power source and the terminal load device.

Figure 12A:
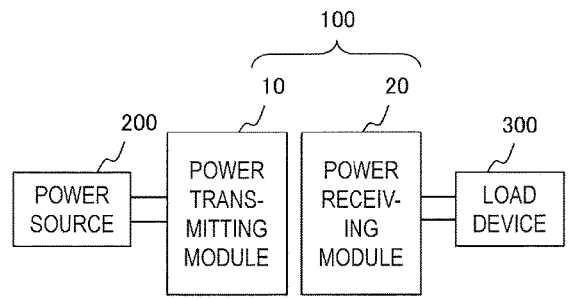
FIG. 12A is a diagram showing a wireless power transmission system which includes one wireless power feeding unit 100.
Figure 12B:
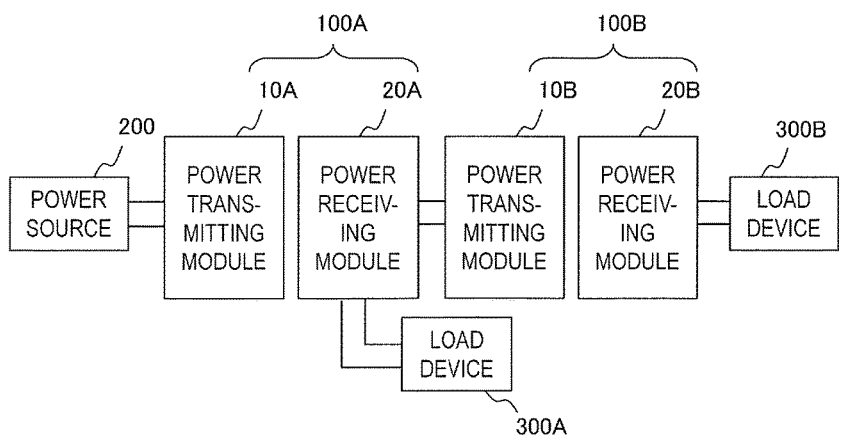
FIG. 12B is a diagram showing a wireless power transmission system in which two wireless power feeding units 100A and 100B are provided between a power source 200 and a terminal load device 300B.
Figure 12C:
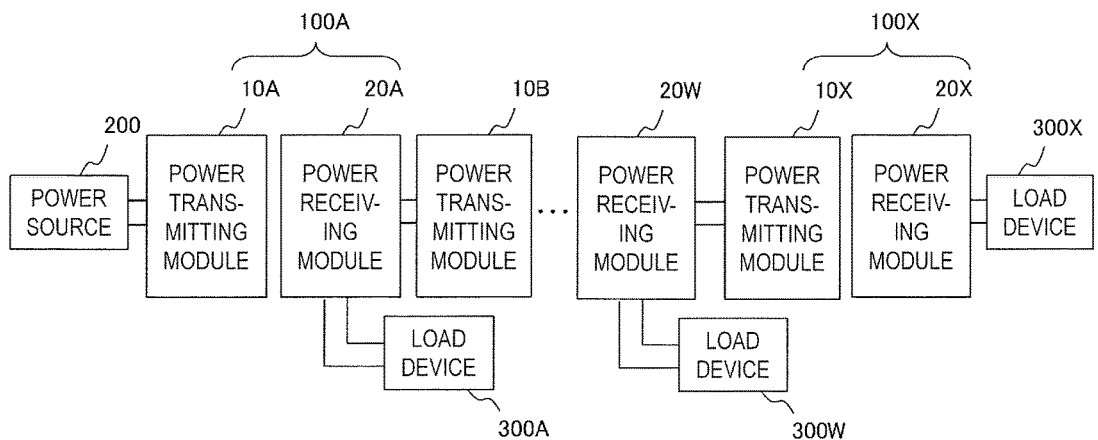
FIG. 12C is a diagram showing a wireless power transmission system in which a multitude of wireless power feeding units 100A through 100X are provided between a power source 200 and a terminal load device 300X.

FIGS. 12A through 12C are schematic diagrams showing different constructions for the wireless power transmission system according to the present disclosure. FIG. 12A shows a wireless power transmission system which includes one wireless power feeding unit 100, similarly to Embodiment 1. FIG. 12B shows a wireless power transmission system in which two wireless power feeding units 100A and 100B are provided between a power source 200 and a terminal load device 300B. In this example, after a power receiving module 20A in the first wireless power feeding unit 100A, a load device 300A and a power transmitting module 10B in the second wireless power feeding unit 100B are connected. FIG. 12C shows a wireless power transmission system in which a multitude of wireless power feeding units 100A through 100X are provided between a power source 200 and a terminal load device 300X. By adopting the construction shown in FIG. 12B or 12C, it becomes possible to achieve wireless power transmission in a plurality of movable sections (e.g., joints or expandable sections) and supply power to a plurality of load devices, as has been described with reference to e.g. FIG. 5.

Figure 13:
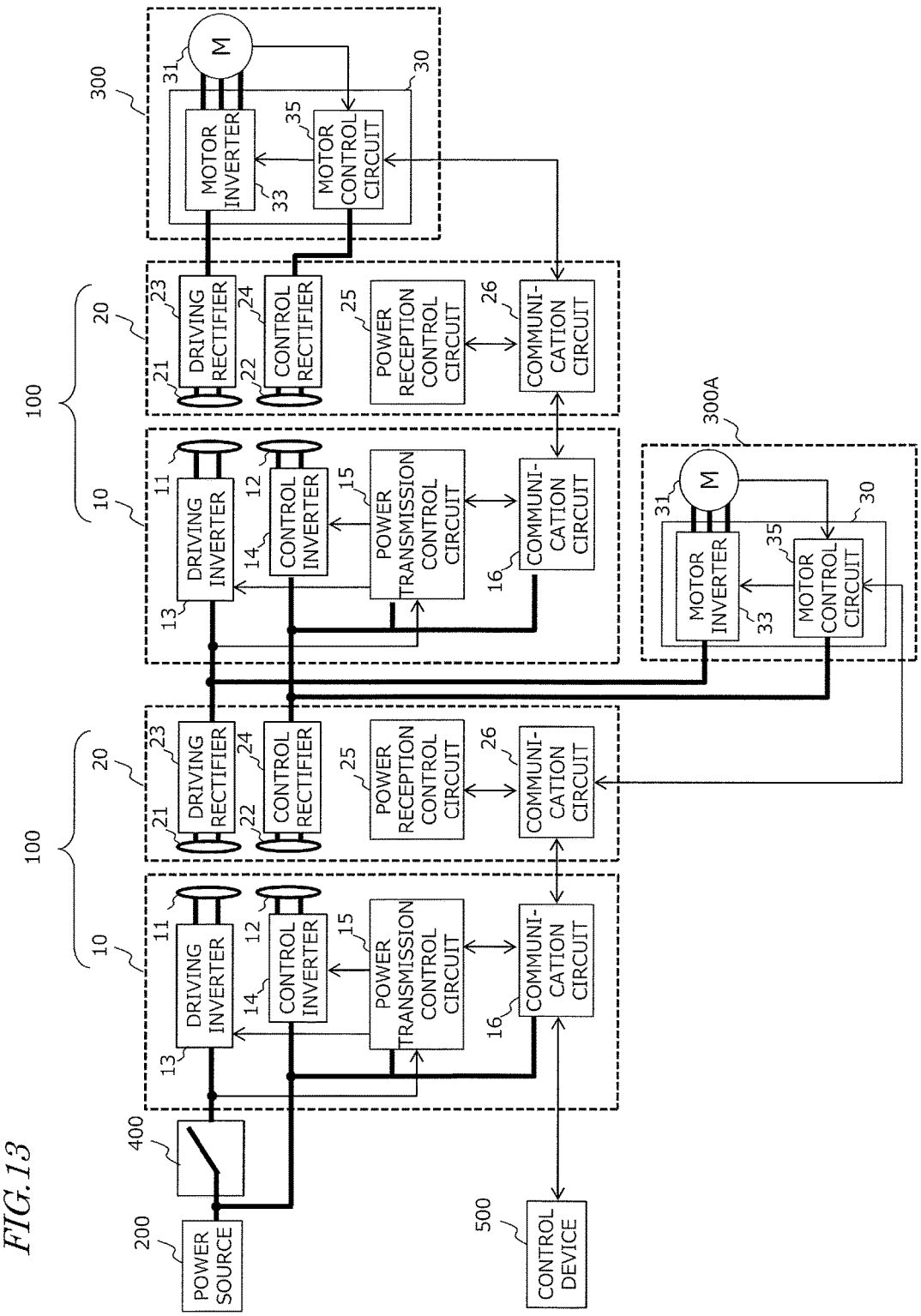
FIG. 13 is a block diagram showing an exemplary construction of a wireless power transmission system including two wireless power feeding units 100A and 100B.

FIG. 13 is a block diagram showing an exemplary construction of a wireless power transmission system including two wireless power feeding units 100A and 100B. Each wireless power feeding unit 100A, 100B has the same construction as that of the wireless power feeding unit 100 of Embodiment 1. This wireless power transmission system includes a first actuator (load device) 300A that is connected to the first wireless power feeding unit 100A and a second actuator (load device) 300B that is connected to the second wireless power feeding unit 100B. The first actuator 300A is connected to a power receiving module 20A in the first wireless power feeding unit 100A. The second actuator 300B is connected to a power receiving module 20B in the second wireless power feeding unit 100B.

The driving rectifier 23 in the first wireless power feeding unit 100A is connected to the driving inverter 13 in the second wireless power feeding unit 100B and the motor inverter 33 in the first actuator 300A. On the other hand, the control rectifier 24 in the first wireless power feeding unit 100A is connected to the control inverter 14 in the second wireless power feeding unit 100B and the motor control circuit 35 in the first actuator 300A. Therefore, even if the emergency stop switch 400 is turned OFF, supply of power to each control inverter 14 and each motor control circuit 35 is maintained. As a result, upon restoration, operation of the actuators 300A and 300B can be swiftly resumed.

In the construction of FIG. 13, the control inverter 14, power transmission control circuit 15, and communication circuit 16 in the second power transmitting module 10B are connected to the control rectifier 24 in the first power receiving module 20A; however, these may alternatively be connected to the driving rectifier 23. In such a construction, when the switch 400 is turned OFF, supply of power to the control system in the second wireless power feeding unit 100B and the second actuator 300B is stopped. However, supply of power to the control system in the first actuator 300A is maintained, and therefore, although partially, effects of the present disclosure will be obtained.

In the construction of FIG. 13, the two wireless power feeding units 100A and 100B may together be regarded as one power feeding unit. Stated otherwise, a wireless power feeding unit may be constructed which includes a plurality of pairs each including a power transmitting module and a power receiving module. A similar construction to that shown in FIG. 13 is also applicable to the multi-unit construction shown in FIG. 12C.

In the wireless power feeding unit 100 according to the present disclosure, the communication circuit 16 in the power transmitting module 10 and the driving rectifier (first rectifier circuit) 23, the control rectifier (second rectifier circuit) 24, the power reception control circuit 25, and the communication circuit 26 in the power receiving module 20 are not essential constituent elements. Such constituent elements may be provided only as necessary.

Figure 14:
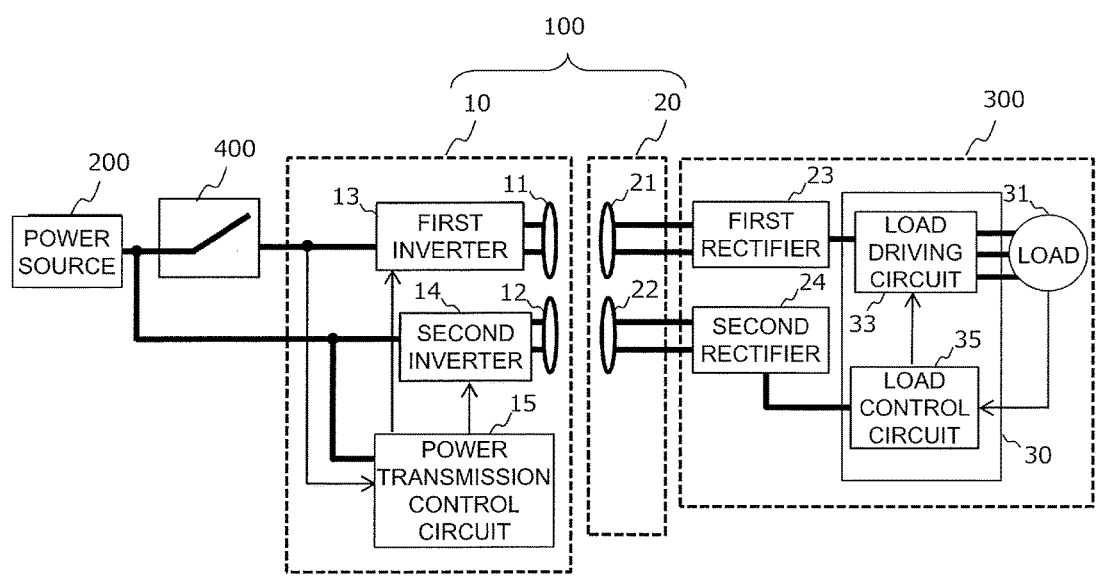
FIG. 14 is a block diagram showing the construction of a wireless power transmission system according to another embodiment of the present disclosure.

FIG. 14 is a block diagram showing the construction of a wireless power transmission system according to another embodiment of the present disclosure. In this wireless power transmission system, the power transmitting module 10 in the wireless power feeding unit 100 lacks the communication circuit 16, whereas the power receiving module 20 lacks the first rectifier circuit 23, the second rectifier circuit 24, the power reception control circuit 25, and the communication circuit 26. On the other hand, the load devices 300 includes the first rectifier circuit 23 connected to the first reception coil 21 and the second rectifier circuit 24 connected to the second reception coil 22. Such a construction can also attain the aforementioned effects.

Instead of the rectifiers 23 and 24 in the example shown in FIG. 14, other types of conversion circuits may also be used. For example, a matrix converter or the like which universally converts a single-phase current into a three-phase current may be used. Such a conversion circuit may be provided in either the power receiving module 20 or the actuator 300.

As described above, the present disclosure encompasses wireless power transmission apparatuses as recited in the following Items.

[Item 1]

A wireless power feeding unit comprising:
a power transmitting module; and
a power receiving module,
the power transmitting module including
  a first inverter circuit which is connected to a power source via a switch, and which converts supplied electric power into first AC power and outputs the first AC power,
  a first transmission coil which is connected to the first inverter circuit, and which sends out the first AC power,
  a second inverter circuit which is connected to the power source or another power source not via the switch, and which converts supplied electric power into second AC power and outputs the second AC power,
  a second transmission coil which is connected to the second inverter circuit, and which sends out the second AC power, and
  a power transmission control circuit which is connected to the power source or another power source not via the switch, and which controls the first and second inverter circuits,
the power receiving module including
  a first reception coil which is opposed to the first transmission coil, and which receives at least a portion of the first AC power, and
  a second reception coil which is opposed to the second transmission coil, and which receives at least a portion of the second AC power, wherein,
at least a portion of the AC power received by the first reception coil is supplied to a load;
at least a portion of the AC power received by the second reception coil is supplied to a load control circuit which controls the load; and
during operation of the first and second inverter circuits, even if the switch is turned OFF to stop supply of power to the first inverter circuit, the power transmission control circuit maintains control of the second inverter circuit.

[Item 2]

The wireless power feeding unit of claim 1, wherein the power transmission control circuit monitors electric power which is supplied to the first inverter circuit, and when detecting that supply of electric power has stopped, stops control of the first inverter circuit while maintaining control of the second inverter circuit.

[Item 3]

The wireless power feeding unit of claim 2, wherein, after stopping control of the first inverter circuit, when detecting that supply of electric power to the first inverter circuit is begun again, the power transmission control circuit resumes control of the first inverter circuit.

[Item 4]

The wireless power feeding unit of any of claims 1 to 3, wherein,
the power transmitting module further includes a first communication circuit which sends a signal for controlling the load;
the power receiving module further includes a second communication circuit which receives the signal having been sent from the first communication circuit and sends the signal to the load control circuit;
the first and second communication circuits are connected to the power source or another power source not via the switch; and
the power transmission control circuit monitors electric power which is supplied to the first inverter circuit, and when detecting that supply of the electric power has stopped, causes the first communication circuit to send a signal for stopping the load, while maintaining control of the second inverter circuit.

[Item 5]

The wireless power feeding unit of claim 4, wherein after causing the first communication circuit to send a signal for stopping the load, when detecting that supply of electric power to the first inverter circuit is begun again, the power transmission control circuit causes the first communication circuit to send a signal for resuming operation of the load.

[Item 6]

The wireless power feeding unit of any of claims 1 to 5, wherein,
the first and second transmission coils are planar coils, one of the first and second transmission coils being disposed inside the other of the first and second transmission coils; and
the first and second reception coils are planar coils, one of the first and second reception coils being disposed inside the other of the first and second reception coils.

[Item 7]

The wireless power feeding unit of claim 6, wherein,
each of the first and second reception coils is covered by a magnetic substance; and
an interspace exists between the magnetic substance covering the first reception coil and the magnetic substance covering the second reception coil.

[Item 8]

The wireless power feeding unit of any of claims 1 to 7, wherein,
the power receiving module further includes
a first rectifier circuit which is connected to the first reception coil, and which converts AC power received by the first reception coil into first DC power and outputs the first DC power, and
a second rectifier circuit which is connected to the second reception coil, and which converts AC power received by the second reception coil into second DC power and outputs the second DC power;
at least a portion of the first DC power which is output from the first rectifier circuit is supplied to the load; and
at least a portion of the second DC power which is output from the second rectifier circuit is supplied to the load control circuit.

[Item 9]

The wireless power feeding unit of claim 8, further comprising:
a second power transmitting module; and
a second power receiving module,
the second power transmitting module including a third inverter circuit which is connected to the first rectifier circuit, and which converts the first DC power into third AC power and outputs the third AC power, a third transmission coil which is connected to the third inverter circuit, and which sends out the third AC power, a fourth inverter circuit which is connected to the first rectifier circuit or the second rectifier circuit, and which converts the first DC power or the second DC power into fourth AC power and outputs the fourth AC power, a fourth transmission coil which is connected to the fourth inverter circuit, and which sends out the fourth AC power, and a second power transmission control circuit which controls the third inverter circuit and the fourth inverter circuit, the second power receiving module including a third reception coil which is opposed to the third transmission coil, and which receives at least a portion of the third AC power, and a fourth reception coil which is opposed to the fourth transmission coil, and which receives at least a portion of the fourth AC power, wherein, at least a portion of the AC power received by the third reception coil is supplied to a further load control circuit which controls a further load; and at least a portion of the AC power received by the fourth reception coil is supplied to the further load control circuit which controls the further load.

[Item 10]

The wireless power feeding unit of any of claims 1 to 9, wherein the load comprises an electric motor.

[Item 11]

A wireless power transmission system comprising:
the wireless power feeding unit of any of claims 1 to 10; and
an apparatus including the load and the load control circuit.

[Item 12]

The wireless power transmission system of claim 11, wherein,
the load comprises an electric motor;
the apparatus is an actuator further including a motor driving circuit which drives the electric motor;
the load control circuit is a motor control circuit which controls the motor driving circuit; and
the actuator causes the power receiving module to move or rotate relative to the power transmitting module while maintaining a state where the first transmission coil and the first reception coil are opposed and the second transmission coil and the second reception coil are opposed.

[Item 13]

A wireless power transmission system comprising:
the wireless power feeding unit of any of claims 1 to 10; and
the switch.

[Item 14]

The wireless power transmission system of claim 13, wherein the switch comprises a direct opening mechanism.

[Item 15]

The power transmitting module in the wireless power feeding unit of any of claims 1 to 10.

[Item 16]

The power receiving module in the wireless power feeding unit of any of claims 1 to 10.

The technique according to the present disclosure is applicable to electrically operated apparatuses, such as robots used in a factory or the like.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2016-232180 filed Nov. 30, 2016, and No. 2017-194331 filed Oct. 4, 2017, the entire contents of which are hereby incorporated by reference.

What is claimed is:

1. A wireless power feeding unit comprising:
a power transmitting module; and
a power receiving module,
the power transmitting module including
a first inverter circuit which is connected to a power source via a switch, and which converts supplied electric power into first AC power and outputs the first AC power,
a first transmission coil which is connected to the first inverter circuit, and which sends out the first AC power,
a second inverter circuit which is connected to the power source or another power source not via the switch, and which converts supplied electric power into second AC power and outputs the second AC power,
a second transmission coil which is connected to the second inverter circuit, and which sends out the second AC power, and
a power transmission control circuit which is connected to the power source or another power source not via the switch, and which controls the first and second inverter circuits,
the power receiving module including
a first reception coil which is opposed to the first transmission coil, and which receives at least a portion of the first AC power, and
a second reception coil which is opposed to the second transmission coil, and which receives at least a portion of the second AC power, wherein,
at least a portion of the AC power received by the first reception coil is supplied to a load;
at least a portion of the AC power received by the second reception coil is supplied to a load control circuit which controls the load; and
during operation of the first and second inverter circuits, even if the switch is turned OFF to stop supply of power to the first inverter circuit, the power transmission control circuit maintains control of the second inverter circuit.

2. The wireless power feeding unit of claim 1, wherein the power transmission control circuit monitors electric power which is supplied to the first inverter circuit, and when detecting that supply of electric power has stopped, stops control of the first inverter circuit while maintaining control of the second inverter circuit.

3. The wireless power feeding unit of claim 2, wherein, after stopping control of the first inverter circuit, when detecting that supply of electric power to the first inverter circuit is begun again, the power transmission control circuit resumes control of the first inverter circuit.

4. The wireless power feeding unit of claim 1, wherein,
the power transmitting module further includes a first communication circuit which sends a signal for controlling the load;
the power receiving module further includes a second communication circuit which receives the signal having been sent from the first communication circuit and sends the signal to the load control circuit;
the first and second communication circuits are connected to the power source or another power source not via the switch; and
the power transmission control circuit monitors electric power which is supplied to the first inverter circuit, and when detecting that supply of the electric power has stopped, causes the first communication circuit to send a signal for stopping the load, while maintaining control of the second inverter circuit.

5. The wireless power feeding unit of claim 4, wherein after causing the first communication circuit to send a signal for stopping the load, when detecting that supply of electric power to the first inverter circuit is begun again, the power transmission control circuit causes the first communication circuit to send a signal for resuming operation of the load.

6. The wireless power feeding unit of claim 1, wherein,
the first and second transmission coils are planar coils, one of the first and second transmission coils being disposed inside the other of the first and second transmission coils; and
the first and second reception coils are planar coils, one of the first and second reception coils being disposed inside the other of the first and second reception coils.

7. The wireless power feeding unit of claim 6, wherein,
each of the first and second reception coils is covered by a magnetic substance; and
an interspace exists between the magnetic substance covering the first reception coil and the magnetic substance covering the second reception coil.

8. The wireless power feeding unit of claim 1, wherein,
the power receiving module further includes
a first rectifier circuit which is connected to the first reception coil, and which converts AC power received by the first reception coil into first DC power and outputs the first DC power, and
a second rectifier circuit which is connected to the second reception coil, and which converts AC power received by the second reception coil into second DC power and outputs the second DC power;
at least a portion of the first DC power which is output from the first rectifier circuit is supplied to the load; and
at least a portion of the second DC power which is output from the second rectifier circuit is supplied to the load control circuit.

9. The wireless power feeding unit of claim 8, further comprising:
a second power transmitting module; and
a second power receiving module,
the second power transmitting module including
a third inverter circuit which is connected to the first rectifier circuit, and which converts the first DC power into third AC power and outputs the third AC power,
a third transmission coil which is connected to the third inverter circuit, and which sends out the third AC power,
a fourth inverter circuit which is connected to the first rectifier circuit or the second rectifier circuit, and which converts the first DC power or the second DC power into fourth AC power and outputs the fourth AC power,
a fourth transmission coil which is connected to the fourth inverter circuit, and which sends out the fourth AC power, and
a second power transmission control circuit which controls the third inverter circuit and the fourth inverter circuit,
the second power receiving module including
a third reception coil which is opposed to the third transmission coil, and which receives at least a portion of the third AC power, and
a fourth reception coil which is opposed to the fourth transmission coil, and which receives at least a portion of the fourth AC power, wherein,
at least a portion of the AC power received by the third reception coil is supplied to a further load control circuit which controls a further load; and
at least a portion of the AC power received by the fourth reception coil is supplied to the further load control circuit which controls the further load.

10. The wireless power feeding unit of claim 1, wherein the load comprises an electric motor.

11. A wireless power transmission system comprising:
the wireless power feeding unit of claim 1; and
an apparatus including the load and the load control circuit.

12. The wireless power transmission system of claim 11, wherein,
the load comprises an electric motor;
the apparatus is an actuator further including a motor driving circuit which drives the electric motor;
the load control circuit is a motor control circuit which controls the motor driving circuit; and
the actuator causes the power receiving module to move or rotate relative to the power transmitting module while maintaining a state where the first transmission coil and the first reception coil are opposed and the second transmission coil and the second reception coil are opposed.

13. A wireless power transmission system comprising:
the wireless power feeding unit of claim 1; and
the switch.

14. The wireless power transmission system of claim 13, wherein the switch comprises a direct opening mechanism.

15. The power transmitting module in the wireless power feeding unit of claim 1.

16. The power receiving module in the wireless power feeding unit of claim 1.

* * * * *